United States Patent
Schoen et al.

(10) Patent No.: US 6,884,289 B2
(45) Date of Patent: Apr. 26, 2005

(54) COLORED PIGMENTS

(75) Inventors: Sabine Schoen, Darmstadt (DE); Christoph Schmidt, Kriftel (DE)

(73) Assignee: Merck Patent Gmbh, Darmstadt (DE)

( * ) Notice: Subject to any disclaimer, the term of this patent is extended or adjusted under 35 U.S.C. 154(b) by 0 days.

(21) Appl. No.: 10/128,521

(22) Filed: Apr. 24, 2002

(65) Prior Publication Data

US 2002/0192448 A1 Dec. 19, 2002

(30) Foreign Application Priority Data

Apr. 24, 2001 (DE) .......................... 101 20 179

(51) Int. Cl.[7] ............................... C09C 1/00
(52) U.S. Cl. ................ 106/415; 106/418; 106/436; 106/437; 106/438; 106/439; 106/441; 106/442; 106/446; 428/403; 428/404; 428/328
(58) Field of Search ................ 106/415, 418, 106/436–439, 441–442, 446, 417; 428/403–404, 328

(56) References Cited

U.S. PATENT DOCUMENTS

| | | | | | |
|---|---|---|---|---|---|
| 3,951,679 | A | * | 4/1976 | Bernhard et al. | 106/291 |
| 6,132,873 | A | * | 10/2000 | Dietz et al. | 428/404 |
| 6,280,520 | B1 | * | 8/2001 | Andes et al. | 106/415 |
| 6,284,032 | B1 | * | 9/2001 | Andes et al. | 106/436 |
| 6,689,205 | B1 | * | 2/2004 | Bruckner et al. | 106/415 |

FOREIGN PATENT DOCUMENTS

| | | | |
|---|---|---|---|
| DE | 2313332 | * 3/1973 | |
| DE | WO 98/12266 | * 3/1998 | ............. C09C/1/00 |
| EP | WO98/53011 | * 11/1998 | |

* cited by examiner

*Primary Examiner*—G. Melissa Koslow
*Assistant Examiner*—Shalie A. Manlove
(74) *Attorney, Agent, or Firm*—Millen White Zelano & Branigan, P.C.

(57) ABSTRACT

The present invention relates to colored pigments based on multicoated platelet-shaped substrates which are distinguished by the fact that they comprise (A) a coating having a refractive index of n>1.8 and a layer thickness of 20–500 nm, (B) a colorless coating having a refractive index of n≦1.8 and a layer thickness of 10–100 nm, (C) a colorless coating having a refractive index of n>1.8 and a layer thickness of 20–500 nm, (D) a covering of absorbent pigment particles having a particle size of 1–500 nm, and optionally (E) an outer protective layer, and to their use in paints, coatings, printing inks, plastics, ceramic materials, glasses, for laser marking, in cosmetic formulations and for the production of pigment preparations and dry preparations.

16 Claims, No Drawings

COLORED PIGMENTS

The present invention relates to colored pigments based on multicoated platelet-shaped substrates.

Luster or effect pigments are employed in many areas of industry, in particular in the area of automotive paints, decorative coatings, plastics, surface coatings, printing inks and cosmetic formulations.

Luster pigments based on transparent platelet-shaped substrates which do not have a "hard" metallic luster are the subject-matter of WO 93/12182. Mica platelets are covered with a high-refractive-index metal-oxide layer, such as, for example, $TiO_2$, and a non-selectively absorbing layer. Depending on the $TiO_2$ layer thickness, these pigments exhibit a certain interference color when viewed perpendicularly which becomes weaker and weaker with increasingly oblique viewing angle and finally drops off to grey or black. The interference color does not change, but a decrease in color saturation is observed.

JP 1992/93206 claims luster pigments based on glass platelets or mica particles which are covered with an opaque metal layer and alternating $SiO_2$ and $TiO_2$ layers.

EP 0 753 545 A2 discloses goniochromatic luster pigments based on multicoated, high-refractive-index, non-metallic, platelet-shaped substrates which are at least partially transparent to visible light, which pigments have at least one layer pack comprising a colorless, low-refractive-index coating and a reflective coating which absorbs selectively or non-selectively.

The multilayer pigments known from the prior art are in some cases built up from layer materials which have little or no transparency to light and can therefore only be combined with absorption pigments in a very restricted manner in use. In addition, the interference color of these pigments is highly dependent on the viewing angle, which is undesired in the majority of applications. Furthermore, these pigments are in some cases very difficult to prepare or reproduce.

An object of the present invention is to provide colored multilayer pigments of high tinting strength which do not have pronounced goniochromaticity, are distinguished by their advantageous applicational properties and at the same time can be prepared in a simple manner.

Surprisingly, colored pigments based on multicoated platelet-shaped substrates have now been found which have a certain arrangement of optically functional layers and an outer layer consisting of absorption pigments, producing particular color effects.

Pigments having colored pigment particles are disclosed, for example, in German Patent 23 13 332 and German Patent 33 34 596. The pigments described therein are based on platelet-shaped substrates which are coated with a metal-oxide layer and subsequently with Prussian Blue. However, the pigments from the prior art are not multilayer pigments. The colored multilayer pigments according to the invention are distinguished compared with the pigments from the prior art by their extremely high chroma C ("tinting strength"), high hiding power, high color purity of the interference color and very strong luster and, in contrast to the goniochromatic pigments from the prior art, have little or no angle dependence of the interference color.

The invention thus relates to colored pigments based on multicoated platelet-shaped substrates, characterised in that they comprise (A) a coating having a refractive index of n>1.8 and a layer thickness of 20–500 nm, (B) a colorless coating having a refractive index of n≦1.8 and a layer thickness of 10–100 nm, (C) a colorless coating having a refractive index of n>1.8 and a layer thickness of 20–500 nm, (D) a covering of absorbent pigment particles having a particle size of 1–500 nm, and optionally (E) an outer protective layer.

The invention furthermore relates to the use of the pigments according to the invention in paints, coatings, printing inks, plastics, ceramic materials, glasses and for laser marking. Owing to the high color strength, the pigments according to the invention are particularly suitable for decorative cosmetics. Furthermore, the pigments according to the invention are also suitable for the production of pigment preparations and for the production of dry preparations, such as, for example, granules, chips, pellets, briquettes, etc. The dry preparations are particularly suitable for printing inks and coatings.

Suitable base substrates for the colored pigments according to the invention are transparent platelet-shaped substrates. Preferred substrates are phyllosilicates. Particularly suitable substrates are natural and/or synthetic mica, talc, kaolin, platelet-shaped iron oxides or aluminium oxides, glass platelets, $SiO_2$ platelets, $TiO_2$ platelets, graphite platelets, synthetic support-free platelets, BiOCl or other comparable materials.

The size of the base substrates is not crucial per se and can be matched to the respective application. In general, the platelet-shaped substrates have a thickness of between 0.05 and 5 µm, in particular between 0.1 and 4.5 µm. The extension in the two other regions is usually between 1 and 250 µm, preferably between 2 and 200 µm, and in particular between 5 and 60 µm. The aspect ratio, and the ratio between the thickness and the length and width, are such that the substrates are platelet-shaped. The aspect ratio is preferably 10 to 200. The thickness of the individual layers on the base substrate affects the optical properties of the pigment. Layer (B) in particular has a significant effect on the color properties. Layer (B) is preferably comparatively thin compared with layers (A) and (C). The ratio between the layer thickness (A) or (C) and (B) is preferably from 2:1 to 5:1. In the case of layer thicknesses (B) of less than 100 nm, the dependence of the color shade angle on the viewing angle decreases in such a way that only the interference color of the pigment according to the invention is visible, i.e. no angle-dependent color flop between a number of intense interference colors is observed.

For a pigment of high color strength, the thickness of the individual layers is preferably adjusted precisely with respect to one another.

The interference pigments according to the invention have alternating high-refractive-index layers (A) or (C) and low-refractive-index layers (B). The high-refractive-index layers (A) and (C) have a refractive index of n>1.8, preferably n≧2.0.

Layer (A) preferably is $TiO_2$, $ZrO_2$, $SnO_2$, ZnO, BiOCl, $Ce_2O_3$, $Fe_2O_3$, $Fe_3O_4$, $Cr_2O_3$, Ti suboxides ($TiO_2$ partially reduced with oxidation states of from <4 to 2, such as the lower oxides $Ti_3O_5$, $Ti_2O_3$ up to TiO), titanium oxynitrides and titanium nitride, CoO, $Co_3O_4$, $VO_2$, $V_2O_3$, NiO, $CoAl_2O_4$, $BiVO_4$, $Ce_2S_3$, $MoS_2$ or mixtures or combinations thereof. If desired, the oxide mixtures may also be in reduced form. Layer (A) is particularly preferably a colorless layer, in particular a $TiO_2$ layer. The $TiO_2$ here can be in the rutile or anatase modification, preferably rutile.

The thickness of layer (A) is preferably from 20 to 500 nm, more preferably from 30 nm to 400 nm and in particular preferably from 40 to 350 nm.

Colorless low-refractive-index materials which are suitable for coating (B) are preferably metal oxides or the corresponding oxide hydrates, such as, for example, $SiO_2$, $Al_2O_3$, $AlO(OH)$, $B_2O_3$, $MgF_2$, $MgSiO_3$ or a mixture of the said metal oxides. Layer (B) is preferably $SiO_2$, $MgF_2$ or $Al_2O_3$, or mixtures thereof.

It is advantageous for the optical properties of the pigments according to the invention for layer (B) to be very thin. The thickness of layer (B) is preferably from 10 to 100 nm, more preferably from 10 to 90 nm and in particular preferably from 20 to 80 nm.

Layer (C) is preferably $TiO_2$, $ZrO_2$, $ZnO$, $SnO_2$, $Ce_2O_3$, BiOCl or mixtures or combinations thereof. Layer (C) is particularly preferably a $TiO_2$ layer. The $TiO_2$ here can be in the rutile or anatase modification, preferably rutile.

The thickness of layer (C) is preferably from 20 to 500 nm, more preferably from 30 to 400 nm and in particular preferably from 40 to 350 nm.

Layer (D) consists of absorbent pigment particles which have a particle size of preferably from 1 to 500 nm, more preferably from 2 to 400 nm, in particular preferably from 3 to 300 nm. Suitable pigment particles include organic and inorganic colored pigments, Prussian Blue, bismuth vanadate, goethite and magnetite. Suitable inorganic colored pigments include, in particular, haematite, chromium oxide and chromium hydroxide, cobalt aluminate, ultramarine, chromium/iron mixed oxides, spinels, such as, for example, Tenards Blue, cadmium sulfides or selenides, chromate pigments and carbon black. Of the suitable organic colored pigments, particular mention should be made of quinacridones, benzimidazolones, copper phthalocyanine, azo pigments, indanthrenes, 1,4-diketopyrrolopyrroles, perinones, anthanthrones, phthalocyanines, anthraquinones, indigo, thioindigo and derivatives thereof, and Carmine Red.

Layer (D) consists, in particular, of Prussian Blue, magnetite, Carmine Red and/or thioindigo.

The proportion by weight of the colored pigments in layer (D), based on the total pigment, is preferably from 0.1 to 50% by weight, more preferably from 0.5 to 30% by weight and in particular preferably from 1 to 20% by weight. The thickness of layer (D) is preferably from 1 to 500 nm, more preferably from 3 to 400 nm and in particular preferably from 5 to 300 nm.

The coating of the substrates with a high-refractive-index layer (A), a low-refractive-index layer (B), a further colorless high-refractive-index layer (C) and an absorbent layer (D) results in the formation of colored pigments whose color, luster and hiding power can be varied within broad limits.

Particularly preferred colored pigments have the following layer sequences:
substrate+$TiO_2$(A)+$SiO_2$(B)+$TiO_2$(C)+Prussian Blue (D)
substrate+$TiO_2$(A)+$SiO_2$(B)+$TiO_2$(C)+magnetite (D)
substrate+$TiO_2$(A)+$SiO_2$(B)+$TiO_2$(C)+thioindigo (D)
substrate+$TiO_2$(A)+$SiO_2$(B)+$TiO_2$(C)+Carmine Red (D)
substrate+$Fe_2O_3$(A)+$SiO_2$(B)+$TiO_2$(C)+Prussian Blue (D)
substrate+$TiO_2$(A)+$SiO_2$(B)+$TiO_2$(C)+cobalt aluminate (D)

The pigments according to the invention can easily be prepared by the production of high- and low-refractive-index interference layers with precisely defined thickness and a smooth surface on the finely divided, platelet-shaped substrates.

The metal-oxide layers are preferably applied by wet-chemical methods, it being possible to use the wet-chemical coating methods developed for the production of pearlescent pigments. Methods of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or in further patent documents and other publications known to the person skilled in the art.

In the case of wet coating, the substrate particles are suspended in water, and one or more hydrolyzable metal salts are added at a pH which is suitable for hydrolysis, the latter being selected in such a way that the metal oxides or metal oxide hydrates are precipitated directly onto the platelets without secondary precipitations occurring. The pH is usually kept constant by simultaneous metering-in of a base or acid. The pigments are subsequently separated off, washed and dried and optionally ignited, it being possible for the ignition temperature to be optimized with respect to the coating present in each case. In general, the ignition temperatures are between 250 and 1000° C., preferably between 350 and 900° C. If desired, the pigments can be separated off, dried and optionally ignited after application of individual coatings and then re-suspended for precipitation of the further layers.

Coating can furthermore also be carried out in a fluidized-bed reactor by gas-phase coating, it being possible, for example, correspondingly to use the processes proposed in EP 0 045 851 and EP 0 106 235 for the production of pearlescent pigments.

Ti suboxide layers can be produced, for example, by reduction of the $TiO_2$ layer using ammonia, hydrogen or alternatively hydrocarbons and hydrocarbon/ammonia mixtures, as described, for example, in EP-A-0 332 071, DE 19 51 696.8 and DE 19 51 697.7.

The color shade of the pigments can be varied within broad limits by selecting different covering amounts or layers resulting therefrom. The fine tuning for a certain color shade can be achieved beyond the pure choice of amount by approaching the desired color under visual or measurement technology control.

In order to increase the light, water and weather stability, it is frequently advisable, depending on the area of application, to subject the finished pigment to post-coating or post-treatment. Suitable post-coatings or post-treatments are, for example, the processes described in German Patent 22 15 191, DE-A 31 51 354, DE-A 32 35 017, DE-A 33 34 598, DE 40 30 727 A1, EP 0 649 886 A2, WO 97/29059, WO 99/57204, U.S. Pat. No. 5,759,255. This post-coating (layer E) further increases the chemical stability of the pigments or simplifies handling of the pigment, in particular incorporation into various media.

The outer protective layer is preferably organic or inorganic materials, e.g., polymers such as methacrylates or silanes, mixtures of metal oxides such as $Ce_2O_3$, $SiO_2$, $Al_2O_3$, $ZrO_2$, $Cr_2O_3$, or UV absorbers or mixures thereof.

The pigments according to the invention are compatible with a large number of color systems, preferably from the area of paints, coatings and printing inks. For the production of printing inks, a large number of binders, in particular water-soluble grades, is suitable, as marketed, for example, by BASF, Marabu, Pröll, Sericol, Hartmann, Gebr. Schmidt, Sicpa, Aarberg, Siegberg, GSB-Wahl, Follmann, Ruco or Coates Screen INKS GmbH. The printing inks may be water-based or solvent-based. The pigments are furthermore also suitable for the laser marking of paper and plastics, and for applications in the agricultural sector, for example for greenhouse sheeting, and, for example, for the coloring of tent awnings.

For the various applications, the multilayer pigments can also advantageously be used in the form of a mixture with organic dyes, organic pigments or other pigments, such as, for example, transparent and hiding white, colored and black pigments, and with platelet-shaped iron oxides, organic pigments, holographic pigments, LCPs (liquid crystal polymers) and conventional transparent, colored and black luster pigments based on metal oxide-coated mica and $SiO_2$ platelets, etc. The multilayer pigments can be mixed with commercially available pigments and fillers in any ratio.

The pigments according to the invention are furthermore suitable for the production of flowable pigment preparations and dry preparations. The pigment preparations and dry preparations are distinguished by the fact that they comprise one or more pigments according to the invention, binders and optionally one or more additives.

The invention thus also relates to the use of the pigments in formulations such as paints, printing inks, coatings, plastics, ceramic materials, glasses, in cosmetic formulations, for laser marking and for the production of pigment preparations and dry preparations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure[s] of all applications, patents and publications, cited above or below, and of corresponding Germany Application No. 10120179.6, filed Apr. 24, 2001, is hereby incorporated by reference.

EXAMPLES

Example 1

Step 1.1

100 g of mica having a particle size of 10–60 μm are suspended in 2 l of demineralized water and heated to 80° C. with vigorous stirring. 270 ml of $TiCl_4$ solution (400 g of $TiCl_4$/l) are metered into this suspension at pH=2.2. The pH is then adjusted to 7.5 using sodium hydroxide solution (32%), and 222 ml of sodium water-glass solution (13.5% of $SiO_2$) are metered in at this pH. During this addition, the pH is kept constant using hydrochloric acid (10%). 270 ml of $TiCl_4$ solution (400 g of $TiCl_4$/l) are subsequently metered in at pH 2.2. During the addition of the $TiCl_4$ solution, the pH is in each case kept constant using NaOH solution (32%). For work-up, the pigment is filtered off, washed with demineralized water, dried at 110° C. and ignited at 850° C. for 30 minutes.

Step 1.2 (Covering with Prussian Blue)

130 g of interference red pigment from step 1.1 are suspended in 2 l of demineralized water and warmed to 70° C. with vigorous stirring. At this temperature, the pH is adjusted to pH 7.0 using sulfuric acid (10%). At this pH, a solution consisting of 2.6 g of $FeSO_4$×7 $H_2O$, 0.06 g of sulfuric acid (about 97%) and 65 g of demineralized water is metered in. During this addition, the pH is kept constant using ammonium hydroxide solution (10%). A solution of 3.64 g of $K_4[Fe(CN)_6]$×3 $H_2O$ in 195 g of demineralized water is subsequently metered in over the course of about 70 minutes, and the mixture is stirred for a further 30 minutes. Throughout the reaction, air (4–6 l/h) is blown into the suspension. The pigment is filtered off on a suction filter, washed with demineralized water, dried at 100° C. for 12 hours and sieved (mesh width 100 μm), giving a blue pigment powder having strong red pearlescence.

Example 2

Step 2.1

100 g of mica having a particle size of 10–60 μm are suspended in 2 l of demineralized water and heated to 80° C. with vigorous stirring. 200 ml of $TiCl_4$ solution (400 g of $TiCl_4$/l) are metered into this mixture at pH=2.2. The pH is then adjusted to 7.5 using sodium hydroxide solution (32%), and 212 ml of sodium water-glass solution (13.5% of $SiO_2$) are metered in at this pH. During this addition, the pH is kept constant using hydrochloric acid (10%). 220 ml of $TiCl_4$ solution (400 g of $TiCl_4$/l) are subsequently metered in at pH 2.2. During the addition of the $TiCl_4$ solution, the pH is in each case kept constant using NaOH solution (32%). For work-up, the pigment is filtered off, washed with demineralized water, dried at 110° C. and ignited at 850° C. for 30 minutes.

Step 2.2 (Covering with Prussian Blue)

130 g of interference gold pigment from step 2.1 are suspended in 2 l of demineralized water and warmed to 70° C. with vigorous stirring. At this temperature, the pH is adjusted to pH 7.0 using sulfuric acid (10%). At this pH, a solution consisting of 2.6 g of $FeSO_4$×7 $H_2O$, 0.06 g of sulfuric acid (about 97%) and 65 g of demineralized water is metered in. During this addition, the pH is kept constant using ammonium hydroxide solution (10%). A solution of 3.64 g of $K_4[Fe(CN)_6]$×3 $H_2O$ in 195 g of demineralized water is subsequently metered in over the course of about 70 minutes, and the mixture is stirred for a further 30 minutes. Throughout the reaction, air (4–6 l/h) is blown into the suspension. The pigment is filtered off on a suction filter, washed with demineralized water, dried at 100° C. for 12 hours and sieved (mesh width 100 μm), giving a blue pigment powder having strong golden pearlescence.

Example 3

Step 3.1

100 g of mica having a particle size of 10–60 μm are suspended in 2 l of demineralized water and heated to 80° C. with vigorous stirring. 300 ml of $TiCl_4$ solution (400 g of $TiCl_4$/l) are metered into this suspension at pH=2.2. the pH is then raised to 7.5 using sodium hydroxide solution (32%), and 222 ml of sodium water-glass solution (13.5% of $SiO_2$) are metered in at this pH. During this addition, the pH is kept constant using hydrochloric acid (10%). 300 ml of $TiCl_4$ solution (400 g of $TiCl_4$/l) are subsequently metered in at pH 2.2. During the addition of the $TiCl_4$ solution, the pH is in each case kept constant using NaOH solution (32%). For work-up, the pigment is filtered off, washed with water, dried at 110° C. and ignited at 850° C. for 30 minutes.

Step 3.2 (Covering with Prussian Blue)

130 g of interference violet pigment from step 3.1 are suspended in 2 l of demineralized water and warmed to 70° C. with vigorous stirring. At this temperature, the pH is adjusted to pH 7.0 using sulfuric acid (10%). At this pH, a solution consisting of 2.6 g of $FeSO_4$×7 $H_2O$, 0.06 g of sulfuric acid (about 97%) and 65 g of demineralized water is metered in over the course of 45 minutes. During this addition, the pH is kept constant using ammonium hydroxide solution (10%). A solution of 3.64 g of $K_4[Fe(CN)_6]$×3 $H_2O$ in 195 g of demineralized water is subsequently metered in over the course of 70 minutes, and the mixture is stirred for a further 30 minutes. Throughout the reaction, air (4–6 l/h) is blown into the suspension. The pigment is filtered off on a suction filter, washed with water, dried at 100° C. for 12 hours and sieved (mesh width 100 μm), giving a blue pigment powder having violet pearlescence.

Example 4 (Covering with Prussian Blue)

130 g of interference violet pigment from Example 1/step 1.1 are suspended in 2 l of demineralized water and warmed to 70° C. with vigorous stirring. At this temperature, the pH is adjusted to pH 7.0 using sulfuric acid (10%). At this pH, a solution consisting of 31.2 g of $FeSO_4 \times 7\ H_2O$, 0.8 g of sulfuric acid (about 97%) and 780 g of demineralized water is metered in over the course of 6 hours. During this addition, the pH is kept constant using ammonium hydroxide solution (10%). A solution of 43.7 g of $K_4[Fe(CN)_6] \times 3\ H_2O$ in 2.3 l of demineralized water is subsequently metered in over the course of 70 minutes, and the mixture is stirred for a further 30 minutes. Throughout the reaction, air (4–6 l/h) is blown into the suspension. The pigment is filtered off on a suction filter, washed with demineralized water, dried at 100° C. for 12 hours and sieved (mesh width 100 µm), giving a dark-blue pigment powder having violet pearlescence.

Example 5 (Covering with Magnetite)

130 g of gold interference pigment base from Example 2/step 2.1 are suspended in 2 l of demineralized water and heated to 75° C. After the pH has been adjusted to pH 8.0 using NaOH solution (32%), a solution of 18 g of $FeSO_4 \times 7\ H_2O$ and 3.0 g of $KNO_3$ and 1 ml of sulfuric acid (20%) in 50 ml of demineralized water is metered in. During this addition, nitrogen is constantly passed through the suspension (130 l/h), and the pH is kept at pH=8.0 using NaOH solution (32%). The product is filtered off, washed with water, dried at 110° C. for 4 hours and sieved (mesh width 100 µm), giving a grey pigment powder having golden pearlescence.

USE EXAMPLES

| Example A: Nail varnish | |
|---|---|
| 2.00% | of pigment from Example 2 (1) |
| 98.00% | of thixotropic nail-varnish base 1348 (toluene, ethyl acetate, butyl acetate, nitrocellulose, tosylamide/-formaldehyde, resin, dibutyl phthalate, isopropyl alcohol, stearalkonium hectorite, camphor, acrylate copolymer, benzophenone-1) (2) |

Sources of supply:
(1) Merck KGaA
(2) International Lacquers S.A.

| Example B: Eye shadow | |
|---|---|
| Phase A | |
| 30.00% | of pigment from Example 2 (1) |
| 49.50% | of talc (1) |
| 7.50% | of potato starch (solanum tuberosum) (2) |
| 2.50% | of magnesium stearate (1) |
| Phase B | |
| 9.14% | of isopropyl stearate (3) |
| 0.53% | of cetyl palmitate (1) |
| 0.53% | of ewalin 1751 (petrolatum) (4) |
| 0.20% | of fragrance Elegance #79228 D MF (perfume) (5) |
| 0.10% | of propyl 4-hydroxybenzoate (propylparaben) (1) |

The constituents of phase A are homogeneously mixed. The molten phase B is subsequently added to the powder mixture with stirring. The powders are pressed at 40–50 bar.
Sources of supply:
(1) Merck KGaA
(2) Südstärke GmbH
(3) Cognis GmbH
(4) H. Erhard Wagner GmbH
(5) Haarmann & Reimer GmbH

| Example C: Lipstick | |
|---|---|
| Phase A | |
| 15.00% | of pigment from Example 2 (1) |
| Phase B | |
| 8.75% | of beeswax white (cera alba) (1) |
| 5.25% | of paracera C 44 (copernicia cerifera (carnauba wax, ceresin)) (2) |
| 3.50% | of adeps lanae (lanolin) (3) |
| 5.60% | of isopropyl myristate (4) |
| 2.10% | of paraffin viscous (paraffinum liquidum (mineral oil)) (1) |
| 0.05% | of Oxynex ® K liquid (PEG-8, tocopherol, ascorbyl palmitate, ascorbic acid, citric acid) (1) |
| 0.10% | of propyl 4-hydroxybenzoate (propylparaben) (1) |
| 59.45% | of castor oil (ricinus communis) (3) |
| Phase C | |
| 0.20% | of fragrance Tendresse #75418C (perfume) (5) |

The constituents of phase B are heated to 75° C. and melted. The pigments of phase A are added, and everything is stirred well. The lipstick composition is then stirred with the perfume from phase C for 15 minutes in a casting apparatus heated to 65° C. The homogeneous melt is poured into the casting moulds prewarmed to 55° C. The moulds are subsequently cooled, and the castings are removed cold.
Sources of supply:
(1) Merck KGaA
(2) Paramelt
(3) Henry Lamotte GmbH
(4) Cognis GmbH
(5) Haarmann & Reimer GmbH

What is claimed is:

1. A colored pigment comprising a transparent platelet-shaped substrate which is mica, glass, talc, kaolin, aluminium oxide, $SiO_2$, or BiOCl, and thereon
   (A) an optionally functional coating having a refractive index of n>1.8 and a layer thickness of 20–500 nm,
   (B) an optionally functional colourless coating having a refractive index of n≦1.8 and a layer thickness of 10–100 nm,
   (C) an optionally functional colourless coating having a refractive index of n>1.8 and a layer thickness of 20–500 nm,
   (D) a covering of absorbent pigment particles having a particle size of 1–500 nm, and
optionally
   (E) an outer protective layer.

2. A colored pigment according to claim 1, wherein the platelet-shaped substrate is natural or synthetic mica, glass platelets, $Al_2O_3$ platelets, $SiO_2$ platelets or $TiO_2$ platelets.

3. A colored pigment according to claim 1, wherein layer (A) consists of $TiO_2$, $ZrO_2$, ZnO or BiOCl.

4. A colored pigment according to claim 1, wherein layer (B) consists of $SiO_2$, $MgF_2$ or $Al_2O_3$, or mixtures thereof.

5. A colored pigment according to claim 1, wherein the absorbent pigment particles are Prussian Blue, magnetite, Carmine Red and/or thioindigo or a mixture thereof.

6. A colored pigment according to claim 1, wherein layer (A) and layer (C) have the same composition.

7. A colored pigment according to claim 6, wherein layer (A) and layer (C) consist of $TiO_2$.

8. A process for the preparation of the colored pigment according to claim 1, comprising coating of the platelet-shaped substrates by wet-chemical precipitation by hydrolytic decomposition of metal salts in aqueous medium or by CVD or PVD.

9. A paint coating, printing ink, plastic, ceramic material, glass, cosmetic formulation, or laser marking composition, comprising a pigment according to claim 1.

10. A pigment preparation comprising at least one binder and at least one colored pigment according to claim 1.

11. A dry preparation, in the form of pellets, granules, chips or briquettes, comprising a pigment in turn comprising a platelet-shaped substrate, and thereon (A) a coating having a refractive index of n>1.8 and a layer thickness of 20–500 nm, (B) a colorless coating having a refractive index of n≦1.8 and a layer thickness of 10–100 nm, (C) a colorless coating having a refractive index of n>1.8 and a layer thickness of 20–500 nm, (D) a covering of absorbent pigment particles having a particle size of 1–500 nm, and optionally (E) an outer protective layer.

12. A colored pigment consisting of a transparent platelet-shaped substrate which is mica, glass, talc, kaolin, aluminium oxide, $SiO_2$, or BiOCl, and thereon (A) a coating having a refractive index of n>1.8 and a layer thickness of 20–500 nm, (B) a colorless coating having a refractive index of n≦1.8 and a layer thickness of 10–100 nm, (C) a colorless coating having a refractive index of n>1.8 and a layer thickness of 20–500 nm, (D) a covering of absorbent pigment particles having a particle size of 1–500 nm, and optionally (E) an outer protective layer.

13. A colored pigment according to claim 1, wherein layer (A) has a thickness of 40–350 nm, layer (B) has a thickness of 20–80 nm, and layer (C) has a thickness of 40–350 nm.

14. A colored pigment according to claim 1, having a ratio of layer thickness of (A) or (C) to (B) of 2:1 to 5:1.

15. A colored pigment according to claim 13, having a ratio of layer thickness of (A) or (C) to (B) of 2:1 to 5:1.

16. A colored pigment comprising a transparent platelet-shaped substrate which is mica, glass, talc, kaolin, aluminium oxide, $SiO_2$, or BiOCl, and thereon (A) an optionally functional coating having a refractive index of n>1.8 and a layer thickness of 20–500 nm, (B) an optionally functional colorless coating having a refractive index of n≦1.8 and a layer thickness of 10–100 nm, (C) an optionally functional colorless coating having a refractive index of n>1.8 and a layer thickness of 20–500 nm, (D) a covering of absorbent pigment particles having a particle size of 1–500 nm, and optionally (E) an outer protective layers, whereby said pigment possesses high hiding power and little or no angle dependence of the interference color.

* * * * *

UNITED STATES PATENT AND TRADEMARK OFFICE
CERTIFICATE OF CORRECTION

PATENT NO. : 6,884,289 B2  
APPLICATION NO. : 10/128521  
DATED : April 26, 2005  
INVENTOR(S) : Christoph Schmidt Page 1 of 1

It is certified that error appears in the above-identified patent and that said Letters Patent is hereby corrected as shown below:

Column 8, line 41, reads "optionally" should read -- optically --

Signed and Sealed this

Twenty-fourth Day of March, 2009

JOHN DOLL  
*Acting Director of the United States Patent and Trademark Office*